United States Patent Office
3,567,492
Patented Mar. 2, 1971

3,567,492

METHOD FOR TREATING STONE TO OBTAIN IMPROVED BONDING TO BITUMINOUS MATERIAL

Peter M. Burrill, Cowbridge, Wales, assignor to Midland Silicones Limited, Berkshire, England No Drawing. Filed June 24, 1968, Ser. No. 739,145
Int. Cl. B44d *1/14*
U.S. Cl. 117—72 5 Claims

ABSTRACT OF THE DISCLOSURE

A method for bonding a bituminous material to stone surfaces employing an aqueous emulsion of certain organosilicon materials as a primer on the stone. The aqueous emulsion of organosilicon material is applied to the stone and the coating is dried prior to application of the bituminous material thereto.

This invention relates to the treatment of solid materials and is particularly concerned with improving the adhesion of bituminous materials to stone.

A widely employed method of surfacing roads comprises applying to the road as the surfacing materials stone fragments in combination with a bituminous material. In such a method the stone may be treated with the bituminous material prior to application to the road or the bituminous material is first applied as a thin liquid layer and stone particles (or chippings) deposited thereon. The successful application of either method relies on good adhesion between the bituminous material to the stone and, when the stone is dry, satisfactory adhesion is generally obtained. However, it is often the case that road surfacing has to be performed when the stone chippings are wet, or that the bitumenised aggregate for application to the surface has to be prepared from wet stone fragments. In such cases poor adhesion between the stone and the bituminous material often results leading to difficulties in obtaining a fully satisfactory surface. Similar problems of adhesion are also encountered when it is necessary to apply a layer of a bituminous material, for example, for waterproofing or sealing purposes to stone surfaces.

It has been proposed to produce a road surfacing material comprising a mix containing as constituents aggregate and bitumen the method of producing the material comprising treating one of the constituents with a heat stable liquid silicone having the property of preventing the stripping of the bitumen from the aggregate. In accordance with the said proposal an organic solvent solution of a phenylmethyl organopolysiloxane in xylene is incorporated in the road surfacing material by mixing with the bitumen before application with the bitumen to the aggregate. Alternatively an aqueous solution of a sodium methyl siliconate is applied directly to the aggregate prior to mixing with the bitumen. Both methods of carrying out the proposal however have significant disadvantages. For example, in the former method it has been found that when a solvent based organopolysiloxane is added to the bitumen relatively large proportions of the organopolysiloxane are required to obtain a satisfactory result. In addition the use of organic solvents introduces toxic and fire hazards and requires special equipment. In connection with the latter method the siliconates are caustic materials and also require special precautions to be taken during handling. They are also not totally effective when applied to siliceous materials.

We have now found that an improved method of increasing the adhesion between the stone and a bituminous material resides in contacting the stone surface, prior to contact with a bituminous material, with an emulsion of an organosilicon material. The application of an organosilicon material to the stone in this manner improves significantly the adhesion between the stone and the bituminous material under wet conditions and we have found that such treatment is effective even when the emulsion contains a very low concentration of siloxane. In addition the use of an emulsion is advantageous in that it eliminates the handling hazards and difficulties associated with large volumes of organic solvents or caustic materials.

Accordingly this invention provides a process for bonding a bituminous material to a stone surface which comprises applying to the stone surface an aqueous emulsion of an organosilicon material, drying the treated surface and thereafter contacting the surface with a bituminous material.

Included within the scope of this invention is a composite or structure containing stone bonded to a bituminous material whenever obtained by the process of the invention.

The process of this invention may be employed in the bonding of bituminous materials to any of the types of stone commonly employed in the form of chippings, or larger fragments, in road making or in building structures. Depending on the particular application the process may be performed in any of several ways. For example in one application of this invention in road surfacing stone chippings or fragments used for this purpose are treated with the emulsion of the organosilicon material and then distributed over the bituminous material which has previously been applied to the road surface. In another method of applying the invention the chippings or fragments to which the emulsion has been applied are first contacted with the bituminous material and the aggregate so obtained is then applied to the road surface. When sealing or weatherproofing stone buildings the procedure will usually involve treating the stone surface with the emulsion of the organosilicon material and thereafter applying a layer of the bituminous material over the treated surface.

The organosilicon materials which are employed in the process of this invention are preferably organopolysiloxanes and may be of the resinous or nonresinous type. Thus, for example, they may vary from resin-forming materials having on average less than one organic radical per silicon atom to substantially linear organopolysiloxanes having in the molecule more than two organic radicals per silicon atom.

The organic radicals present in the organopolysiloxane are preferably monovalent hydrocarbon radicals, for example alkyl radicals such as methyl, ethyl, propyl, butyl, hexyl, and octadecyl, alkenyl radicals such as vinyl, allyl and cyclohexenyl, aryl radicals such as phenyl, naphthyl and xenyl; alkaryl radicals such as tolyl and ethylphenyl and aralkyl radicals such as benzyl and xylyl. At least 50 percent of the silicon-bonded organic radicals in the organosilicon material should be monovalent hydrocarbon radicals. Any remaining silicon-bonded substituents may be hydrogen atoms, monovalent hydrocarbonoxy or monovalent substituted hydrocarbon radicals for example alkoxy radicals, halogenated hydrocarbon radicals such as chloromethyl, bromophenyl and trifluoropropyl and radicals such as aminoalkyl and cyanoalkyl radicals. The presence of such substituted radicals and hydrogen atoms however, tends to increase the cost of the organosilicon material and for economic considerations we prefer to employ organosilicon materials, particularly organopolysiloxanes, in which the silicon-bonded substituents are predominantly hydrocarbon radicals, in particular methyl radicals and/or phenyl radicals. Examples of organopolysiloxanes for use according to this invention are dimethylpolysiloxanes, methylhydrogen polysiloxanes, copolymers of dimethylsiloxane units and phenylmethyl siloxane units, monophenyl polysiloxanes, and copolymers containing monophenylsiloxane units and one or more of dimethylsiloxane units, diphenylsiloxane units, phenylmethylsiloxane units and monomethylsiloxane units.

Particularly preferred organosilicon materials from an economic standpoint are those which can be obtained by hydrolysing or partially hydrolysing the distillable by-produced chlorosilicon compounds obtained from the reaction of alkyl or aryl chlorides with silicon. The process, involving the reaction of an alkyl or aryl halide with silicon, is now well known. The desired products of the process are the alkyl and aryl halosilanes, for example methyl trichlorosilane and dimethyldichlorosilane, which are separated from the reaction product by distillation and thereafter employed in the manufacture of commercially useful materials. As a by-product of the reaction there is obtained after distillation a residue from which a mixture of chlorosilicon compounds may be obtained by further distillation at temperatures of up to about 200° C. The said distillable by-produced chlorosilicon compounds comprise organic substituted and non-organic substituted silanes, disilanes, disiloxanes, silmethylene compounds and a proportion of organic compounds such as benzene and toluene. Hydrolysis, or alcoholysis followed by hydrolysis, of this mixture of chlorosilicon compounds provides a resinous organosilicon material which is a mixture of organopolysiloxanes, silmethylene compounds (with or without the presence of silarylene compounds) and nonsiloxane products. This resinous product is usually obtained as an organic solvent solution and may contain a proportion of silicon-bonded alkoxyl radicals, for example methoxyl or butoxyl radicals which may vary from substantially nil to 30 percent or more by weight of the resin. One method for preparing this type of resinous product is described in British Pat. No. 714,461.

The organosilicon materials are applied to the stone surface in the form of an aqueous emulsion. Any suitable method or technique may be employed to prepare emulsions for use according to this invention. Aqueous emulsions of organosilicon materials are well-known commodities and methods of obtaining them will be readily apparent to those skilled in the art. Generally, to obtain a stable emulsion the use of an emulsifying agent is required. When employed the emulsifying agent may be of the anionic, cationic or nonionic variety or of combinations of more than one type. Examples of emulsifying agents which may be employed are the condensation products of ethylene oxide with fatty acids or with alcohols, for example the trimethylnonyl ether of polyethylene glycol, the monostearic acid ester of polyethylene glycol and polyoxyethylated derivatives of oleic acid, sodium salts of alkylated polyether sulphates, sorbitan monostearate, quaternary ammonium halides and polyvinyl alcohol. When the organosilicon material is resinous in nature the preferred emulsifying agents are the salts formed from organic acids and amines containing long chain alkyl radicals, for example octadecylamine acetate. Emulsifying agents of this type are particularly suitable for use with resinous materials derived from the by-produced chlorosilicon compounds.

Advantageously the emulsifying system may be chosen to provide an emulsion which breaks on contact with the stone.

The proportion of organosilicon material present in the treating emulsion may be varied within wide limits. From consideration of cost the concentration of the organosilicon material in the emulsion is best maintained at the minimum consistent with achievng the desired result. For most applications we have found that emulsions containing from 0.05 to 10 percent, preferably from 0.1 to about 5%, of the organosilicon material are suitable.

If desired the organosilicon material may be stabilised against the effects of dissolved minerals by incorporating therein a minor proportion, for example about 0.1% by weight, of sodium nitrite.

Any suitable method of application of the emulsion, such as spraying, brushing or immersion, may be used. The stone to which the emulsion has been applied should be dried following such application to remove at least a substantial part of the aqueous portion of the emulsion prior to contacting the treated surface with the bituminous material. Drying may be allowed to occur at ambient temperatures, for example by storing the treated stone, or may be accelerated by the application of heat.

Following the treatment of the stone surface by application of the emulsion and drying, the treated surface is contacted with the bituminous material. It is not essential that contact takes place immediately. If desired the treated stone may be stored for an appreciable length of time before use.

Contact of the treated stone with a bituminous material may take place under wet or dry conditions. Thus it is not essential to keep the treated stone dry or, if it has become wet, for example during transport or storage, to dry it prior to contact with the bituminous material. We have found that good adhesion can be obtained between the treated stone and the bituminous material even if the stone is wet.

Any type of stone may be bonded to a bituminous material according to this invention including for example Mountsorrel Granite, Pennant, Greywackes stone and Basaltic Granite. The invention is particularly applicable in road surfacing and stone used for this purpose is preferred.

The bituminous materials employed may be any of those which are used in road surfacing or in sealing or weatherproofing stone or brick structures. Such materials include for example asphalt, asphaltites, asphaltic pyrobitumens, mineral waxes, and tars and pitches obtained by the destructive distillation of coal. It will of course be understood that where the bituminous material is a solid it will usually be necessary to render it flowable, normally by heating, prior to contact with the treated stone surface.

The following examples illustrate the invention.

EXAMPLE 1

1200 parts by weight of a mixture of chlorosilicon compounds boiling between about 70 and about 200° C. and obtained as the by-product of the reaction of methyl chloride and silicon were dissolved in 760 parts by weight of xylene and the solution added slowly to 1450 parts by weight of a mixture of equal parts of methanol and water. After removal of the aqueous acid layer, 183 parts of propylene oxide were added to neutralise any HCl remaining in the nonaqueous phase. The product was a solution of an organosilicon resin containing approximately 0.5 percent by weight of silicon-bonded methoxy radicals. To this resin solution was added approximately 4 percent by weight of a resin copolymer of $SiO_2$ and $(CH_3)_3SiO_{0.5}$ units and the xylene content adjusted by distillation to give a solution containing approximately 50 percent by weight of siloxane solids.

100 parts by weight of the above solution were mixed with 5 parts by weight of octadecylamine acetate and 10 parts of methanol and sufficient of the mixture taken and added with stirring to water to give an emulsion containing 0.25 percent by weight of siloxane. Three hundred grams of 0.5 inch Mountsorrel Granite chippings were immersed in 120 g. of the emulsion, the excess emulsion drained off and the chippings allowed to air dry for 2 days.

At the conclusion of the air drying period the chippings were tested for their ability to adhere to bitumen by means of a test in which approximately 6 g. of 30 second cut-back, undoped tar were poured into a flat tray of 3.25 in. diameter to give a depth of tar in the tray of approximately 0.125 in. The tray was then immersed to a depth of approximately 1 inch in water and the treated chippings pressed into the tar layer. After 5 minutes the chippings were removed and inspected for tar adhesion. The treated chippings showed excellent adhesion to the tar. Chippings which had not been treated and which were subjected to the same test showed no adhesion to the tar.

EXAMPLE 2

5000 g. of dusty 0.375 inch Pennant Stone chippings were sprayed with 600 g. of a 0.25 percent emulsion of a siloxane prepared as in Example 1. The chippings were then force dried in an air oven at 150° C. for half an hour.

After cooling, the chippings were tested in the manner described in Example 1 and showed excellent adhesion to the tar.

EXAMPLE 3

135 parts by weight of methyl trichlorosilane was dissolved in 154 parts by weight of xylene and the solution added slowly to a mixture of 100 parts by weight of methanol and 18 parts by weight of water. The aqueous acid layer was then separated off and the residual HCl in the nonaqueous phase neutralised by the addition of propylene oxide. The nonaqueous phase consisted of a solution of a methylpolysiloxane resin in xylene and to this resin solution was added 11 parts by weight of a resin copolymer of $SiO_2$ and $(CH_3)_3SiO_{0.5}$ units. The xylene content of the solution was then adjusted by distillation to give a solution containing approximately 50 percent by weight of siloxane solids.

This resin solution was emulsified in the manner described in Example 1 and the emulsion applied to Mountsorrel Granite chippings by spraying. After air drying for 2 days the treated chippings were tested by the method described in Example 1 and were found to exhibit good adhesion to the tar.

EXAMPLE 4

Mountsorrel Granite chippings were treated with emulsions prepared from dimethylpolysiloxanes having viscosities of 350 and 1000 cs. respectively at 25° C., the emulsifying agent being cationic in the one case and a mixture of nonionic and anionic in the other.

In both cases the chippings, after being dried at about 120° C. showed good adhesion when tested by the method described in Example 1.

EXAMPLE 5

Mountsorrel Granite chippings were treated by spraying with an emulsion of a mixture of 3 parts by weight of methylhydrogen polysiloxane and 97 parts by weight of a dimethylpolysiloxane gum.

When dried the treated chippings exhibited excellent adhesion to tar when tested by the method described in Example 1.

That which is claimed is:

1. A process for bonding a bituminous material to a stone surface which comprises applying to the stone surface an aqueous emulsion containing from 0.05 to 10 percent by weight of an organosiloxane material selected from organopolysiloxanes having methyl, phenyl or both methyl and phenyl substituents and organosiloxane resins derived from hydrolysis and alcoholysis of distillable by-product chlorosilicon compounds obtained from the reaction of a methylhalide or phenylhalide with silicon or mixtures thereof, drying the treated surface and thereafter contacting the surface with a bituminous material.

2. A process as claimed in claim 1 wherein the organosilicon material is an organopolysiloxane wherein the organic substituents are selected from the group consisting of methyl and phenyl radicals.

3. A process as claimed in claim 1 wherein the organosilicon material is a resin derived from the hydrolysis and alcoholysis of distillable by-product chlorosilicon compounds obtained from the reaction of a methyl halide or phenyl halide with silicon or mixtures thereof.

4. A process as claimed in claim 3 wherein a salt of an organic acid and an amine containing a long chain alkyl radical is employed as an emulsifying agent.

5. A process as claimed in claim 4 wherein there is included in the emulsion a minor proportion of sodium nitrite.

References Cited

UNITED STATES PATENTS

| | | | |
|---|---|---|---|
| 2,595,465 | 5/1952 | Keene et al. | 117—92X |
| 2,970,976 | 2/1961 | Leclercq et al. | 117—123(D)X |
| 3,294,709 | 12/1966 | Nitzsche et al. | 117—123(D)X |
| 3,397,073 | 8/1968 | Fehner | 117—72X |

WILLIAM D. MARTIN, Primary Examiner

R. HUSACK, Assistant Examiner

U.S. Cl. X.R.

94—23; 117—92, 123